United States Patent
Steinemann et al.

(10) Patent No.: US 10,275,399 B2
(45) Date of Patent: Apr. 30, 2019

(54) FASTER MAIN MEMORY SCANS IN UNSORTED DICTIONARY-ENCODED VECTORS

(71) Applicant: SAP SE, Walldorf (DE)

(72) Inventors: Peter Steinemann, Mannheim (DE); Thomas Legler, Walldorf (DE)

(73) Assignee: SAP SE, Walldorf (DE)

( * ) Notice: Subject to any disclaimer, the term of this patent is extended or adjusted under 35 U.S.C. 154(b) by 527 days.

(21) Appl. No.: 14/944,087

(22) Filed: Nov. 17, 2015

(65) Prior Publication Data

US 2017/0139994 A1 May 18, 2017

(51) Int. Cl.
*G06F 17/30* (2006.01)
*G06F 16/22* (2019.01)
*G06F 16/2455* (2019.01)
*G06F 16/901* (2019.01)

(52) U.S. Cl.
CPC ...... *G06F 16/2282* (2019.01); *G06F 16/2455* (2019.01); *G06F 16/9017* (2019.01)

(58) Field of Classification Search
CPC ......... G06F 17/30339; G06F 17/30477; G06F 16/2455; G06F 16/2282
USPC ........................................................ 707/769
See application file for complete search history.

(56) References Cited

U.S. PATENT DOCUMENTS

| 8,996,563 | B2 * | 3/2015 | Bender et al. | 707/769 |
| 2005/0033720 | A1 * | 2/2005 | Verma | G06F 9/466 |
| 2015/0052150 | A1 * | 2/2015 | Sharique | G06F 17/3033 707/747 |
| 2015/0379073 | A1 * | 12/2015 | Verma et al. | 707/715 |

* cited by examiner

*Primary Examiner* — Mark E Hershley
(74) *Attorney, Agent, or Firm* — Mintz Levin Cohn Ferris Glovsky and Popeo, P.C.

(57) ABSTRACT

A ValueID corresponding to a value to be searched for in a database column can be determined by finding a match in a dictionary for the database column. A row of an index vector for the database column at which to begin a scan for the ValueID can be identified by reading a ValueID lookup table that maps each unique ValueID to a starting position in the index vector for the database column. The ValueID can not occur in the index vector prior to the starting position. The index vector can be scanned beginning at the starting position to find at least one occurrence of the ValueID corresponding to the value being searched, and a result that includes one or more row locations in the database column corresponding to the at least one occurrence in the index vector of the ValueID corresponding to the value being searched can be returned.

15 Claims, 3 Drawing Sheets

US 10,275,399 B2

FASTER MAIN MEMORY SCANS IN UNSORTED DICTIONARY-ENCODED VECTORS

TECHNICAL FIELD

The subject matter described herein relates to improvements in scanning efficiency for dictionary-encoded database columns

BACKGROUND

Modern high speed, in-memory database management systems (DBMSs), such as for example the SAP HANA DBMS available from SAP SE of Walldorf, Germany, generally store data in a compressed format using data dictionaries. Doing so can enable significantly improved use of main system memory.

A dictionary compression approach generally involves each column having an associated dictionary in which a list of the unique values in a column is stored. Each unique value in the column is stored only once in the column's data dictionary. The position of a value in the dictionary's list of values is referred to as a ValueID for that particular value. For each valid row in the column, the ValueID (an integer) is stored instead of the real value. In other words, the column itself (also referred to as an attribute or field) includes the real value replaced with the ValueID. Because the ValueID is an integer, use of the ValueID in the original column in place of the real value generally requires less memory space than inclusion of the real value. The array[1 . . . n] holding the ValueIDs for the rows 1 . . . n of the column is referred to as the index vector.

SUMMARY

In one aspect, a method includes determining a ValueID corresponding to a value to be searched for in a database column, the determining comprising finding a match in a dictionary for the database column. The dictionary includes a listing of unique values in the column with corresponding unique ValueIDs. The method further includes identifying a row of an index vector for the database column at which to begin a scan for the ValueID, where the identifying includes reading a ValueID lookup table that maps each unique ValueID to a starting position in the index vector for the database column. The ValueID does not occurring in the index vector prior to the starting position. The index vector is scanned beginning at the starting position to find at least one occurrence of the ValueID corresponding to the value being searched, and a result that includes one or more row locations in the database column corresponding to the at least one occurrence in the index vector of the ValueID corresponding to the value being searched is returned.

In some variations one or more of the following features can optionally be included in any feasible combination. The ValueID lookup table can include group ranges of ValueIDs such that the ValueID lookup table lists, for each group range, a first occurrence in the index vector of any ValueID in the group range. The group ranges can be of a same size or can have variable sizes. The variable sizes can increase exponentially from a first group range along a series of group ranges.

In a further variation of the method, upon determining that a new value for adding to the database column is a new unique value, a new dictionary row can be appended to the dictionary for the database column. The new dictionary row can include the new unique value and a new ValueID that corresponds to the new unique value. An index vector entry that includes the new ValueID corresponding to the new unique value can be appended to an end of the index vector, the ValueID lookup table can be updated to indicate a first position in the index vector where the ValueID occurs, and adding of a new value to a database column can be initiated, which includes determining that the new value is a new unique value.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a high speed in-memory database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
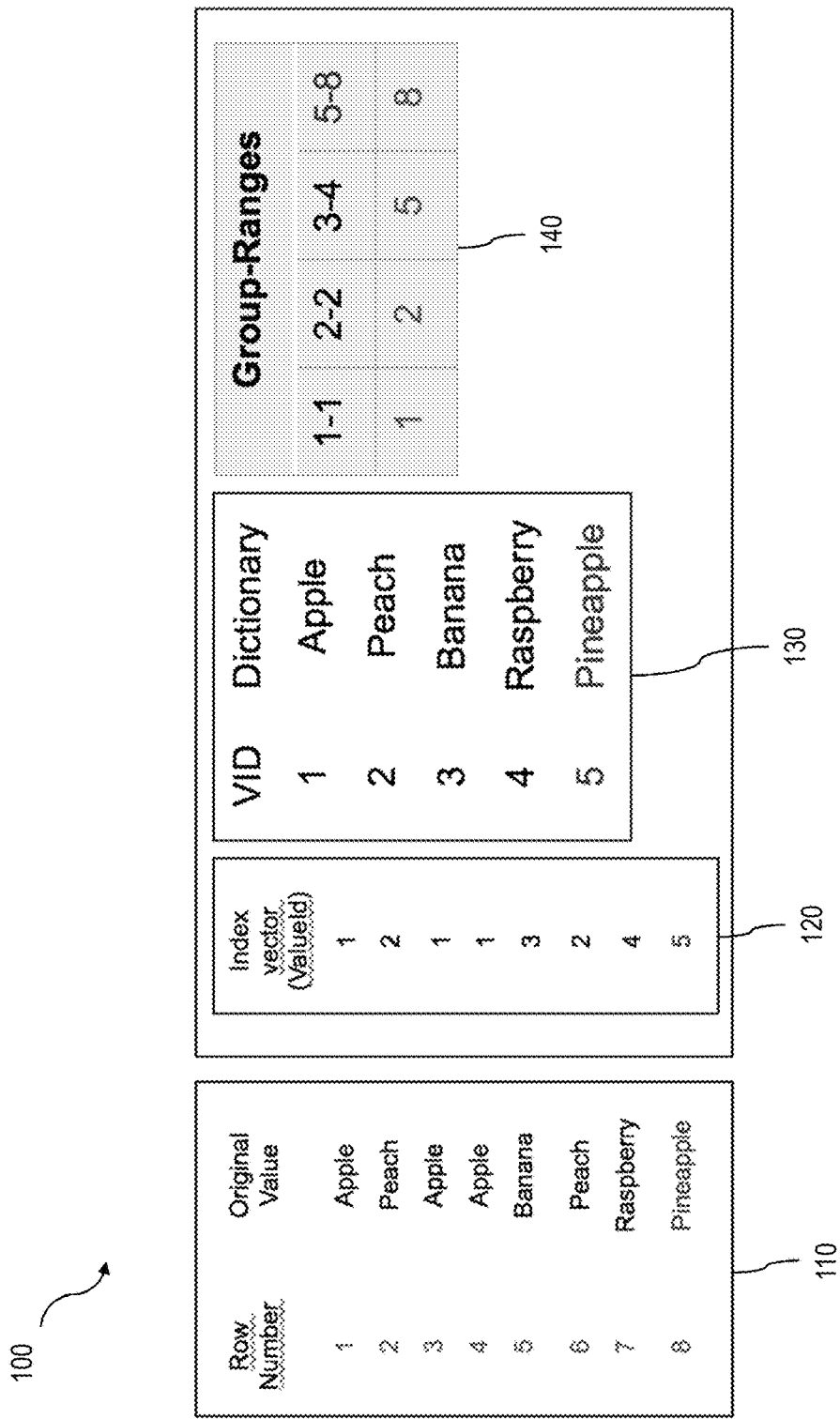
FIG. 1 shows a diagram illustrating data structures consistent with implementations of the current subject matter.

A search on a column (which is used herein to refer to any of a column, an attribute, a field, or the like) for which dictionary compression is used can be performed by mapping values to ValueIDs using the dictionary for the column and then scanning the column's index vector for these ValueIDs. However, index vector are usually quite large and can therefore be very intensive users of expensive (and sometimes limited) main memory resources and of processing resources (e.g. CPU cycles). Bandwidth limitations and transport delays can also occur when non-uniform memory access (NUMA) is necessary, such as for example in a multi-socket (also referred to as a multi-node) system in which every socket has its own memory and accessing of data on a different socket requires transport of data from one socket to another.

Accordingly, it can be desirable to provide an improved approach to searching for one or more specific values in a dictionary-compressed column in a DBMS. Implementations of the current subject matter can be used in addressing this issue, for example by using an approach that includes logging a row number of a first appearance of each ValueID in an index vector, which can assist in reducing the amount of computing resources (e.g. CPU cycles, memory, etc.) for a scan of the index vector relative that is started based on the logged row numbers instead always starting at a first row of the index vector.

In other words, as new values are added to the dictionary column, the new unique values are generally added to the end of the dictionary, without sorting. In other words, dictionary values are stored unsorted in a same order in which incoming unique values to the column are added. As such, older values (e.g. unique values that were added to the column earlier) have lower ValueIDs than more recently added unique values. Additionally, the index vector is filled at least approximately linearly from row 1 to n such that a temporal dependency exists between the occurrence of ValueIDs and the row number of the index vector. A target row of a newly inserted value is generally defined upfront, even before the check for a valid entry.

The term "at least approximately linearly" refers to a relatively rare situation in which two concurrent insert operations can end up in a race condition, where, for example, a first thread T1 assigns row 10 to a new entry, and a second thread T2 assigns row 11. If T1 encounters a delay, T2 inserts first in row 11, then T1 will insert row 10 later. Such a situation could occur even for the order of the ValueIDs in some cases, for example if the first thread T1 receives a first ValueID V1 from the dictionary and the second thread T2 receives a second ValueID V2 (e.g. so that V1<V2). If T2 is faster and therefore reaches the index vector first to append V2, T1 might later reach the index vector and append V1. As noted, such instances are likely to be highly uncommon. Occurrence of such issues may make the described approaches slightly less efficient, but are unlikely to cause a significant negative impact on the overall expected benefits achievable with implementations of the current subject matter.

In an insert-only data structure, such as for example a typical column store database, whenever a valueID is written, it rarely if ever changes. As such, a lowest row position, it rarely changes, and new values are added at the end of the dictionary absent a rarely occurring race condition between threads as discussed above. For example, first and second threads T1 and T2 could insert a same value as follows: T2 might insert the value in the dictionary and calculate the ValueId. Afterwards, T2 would insert in row 11. Then T1 might find the value in the dictionary and add the corresponding ValueId in row 10. It can therefore under some conditions be advantageous to check if a reduction in the offset is needed. As the factors that can lead to such a situation are quite rare, only the check (which is a read operation) might occur in almost all cases.

The set of values stored in the index vector continues to grow as new values are added to the database. In general, when a new record is added to a database table, a value to be added to a column is compared with the entries in the column's dictionary. If no entry yet exists in the dictionary for the value to be added, a new entry is appended to the end of the dictionary to reflect the new unique value. The index vector of the column also has a new row added with a ValueID corresponding to the new unique value.

The above-noted features can be leveraged consistent with implementations of the current subject matter to reduce the memory and/or processor resources need for a scan of a dictionary encoded column to find a given value. A ValueID lookup table can be generated from the dictionary to indicate a row of the index vector at which the value ID first occurs. In a simple example, the ValueID lookup table can be a simple map of individual ValueIDs to a first row of the index vector at which each of the individual ValueIDs first appears in the index vector. In other examples the ValueID lookup table can map a group of ValueIDs to a row of the index vector at which one of the group of ValueIDs first appears in the index vector. The simple example can introduce a significant memory overhead in that the ValueID lookup table includes an additional value (the first row number in the index vector) for each ValueID in the dictionary.

The use of groups of ValueIDs can reduce the overhead in that only one index vector row number is stored for each group of ValueIDs. In some example implementations, each group can include a same number of ValueIDs. In other words, a range of each group can be equal (e.g. each group includes 1000 or some other number of ValueIDs). This approach can be useful in providing an easy and fast to read (e.g. the group number can be determined as Group No.=ValueID/1000). However, the list of groups grows with the number of ValueIDs. In an example in which there are a very large number of ValueIDs relative to the group range size, this can result in a large number of group and relatively low performance benefits because of the increased overhead (e.g. the ValueID lookup table can become quite large)

In another approach consistent with implementations of the current subject matter, the range of groups used in the ValueID lookup table can increase non-linearly. For example, the largest ValueID in a group range can be increased exponentially (e.g. by powers of 2) from one group to the next. In this example, a first group can include ValueID 1 (largest ValueID=$2^0$=1); a second group can include ValueID 2 (largest ValueID=$2^1$=2); a third group can include ValueIDs 3 and 4 (largest ValueID=$2^2$=4); a fourth group can include ValueIDs 5, 6, 7, and 8 (largest ValueID=$2^3$=8). a fifth group can include ValueIDs 9, 10,11, 12, 13, 14, 15, and 16 (largest ValueID=$2^4$=16); and so on. This approach can provide advantages in that the number of possible groups is limited (e.g. in some DBMS environments, the number of ValueIDs possible can be limited to $2^{32}$), and therefore the ValueID lookup table can be pre-allocated in a simple and very fast to manage manner. An exponentially increasing group range can, in some examples, lead to a very large group range size for higher ValueIDs. However, in an application in which there are many different ValueIDs (e.g. a situation in which very large group range sizes might be needed using the exponential approach), the amount of possibly skipped memory reads using the approaches of the current subject matter may be relatively small anyway. Grouping (either by fixed or variable range sizes) can be significantly beneficial in making scans more efficient when searching on key values (which are by definition unique).

FIG. 1 shows a diagram 100 illustrating a simplified example of a column 110 as well as an index vector 120, a dictionary 130, and a ValueID lookup table 140 consistent with implementations of the current subject matter for the column. As shown, the column 110 includes real values and row numbers. In this example, the unique values include "Apple," "Peach," "Banana," "Raspberry," and "Pineapple." Insertion of the value "Pineapple" to the column 110 results in the addition of a new entry with ValueID 5 in the dictionary 130. The index vector 120 includes the ValueID corresponding to the real value for each row number in the column 110. The ValueID lookup table 140 in this example has group ranges based on the exponential approach discussed above. As shown, the ValueID lookup table 140 includes a first group, which includes ValueID 1. The second row of the ValueID lookup table 140 includes the index vector row (1) where this ValueID first occurs. Similarly, the second group in the ValueID lookup table 140 includes ValueID 1, and the second row indicates that the index vector row (2) where this ValueID first occurs. The third group is ValueID 3-4, which has a first occurrence at index row 5 (row 5 of the column 110 has a real value "Banana," which has a ValueID 3. The first instance of ValueID 4 is further down the index vector 120.

An example search operation can also be well-understood in reference to the diagram 100 of FIG. 1. In this example, a search is requested for rows having the value "Raspberry" in the column 110. The dictionary indicates that a ValueID of 4 corresponds to the value "Raspberry," and the ValueID lookup column 140 indicates that a first occurrence of the ValueID 4 is at row 5. Accordingly, the search for rows with ValueID 4 can begin at row 5 of the index vector 120—there is no need to scan rows 1, 2, 3, 4. Starting at row 5 and scanning the index vector 120 results in row 7 being identified as having the ValueID 5 (and therefore the column 110 including the value "Raspberry" at the corresponding row. As can be seen from this simplified illustrative example, performance of searches and other operations that require scanning values in index vectors and/or columns can be improved using implementations of the current subject matter at least because not all rows may need to be searched.

Figure 2:
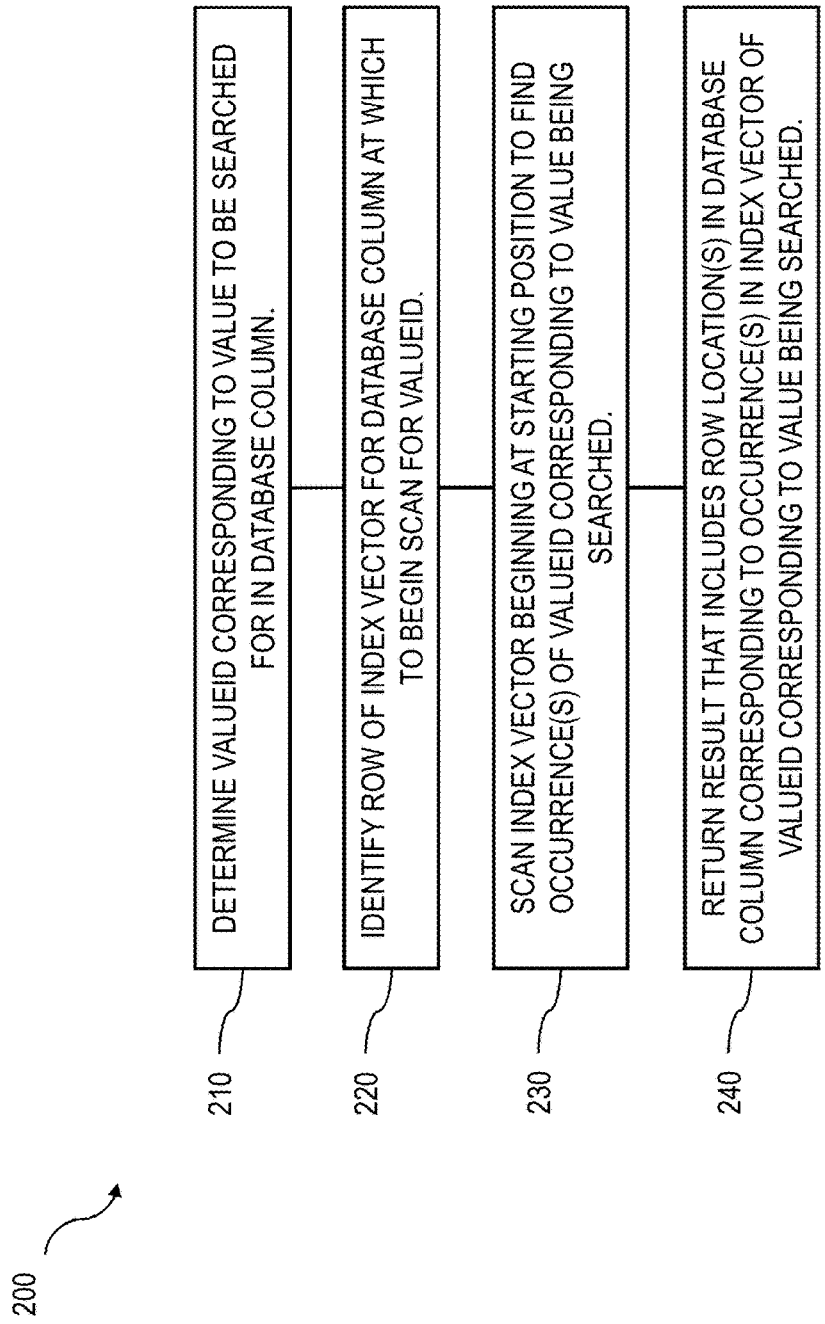
FIG. 2 shows a process flow diagram illustrating aspects of a method having one or more features consistent with implementations of the current subject matter.

FIG. 2 shows a process flow chart 200 illustrating features that can be included in a method to consistent with implementations of the current subject matter. At 210, a ValueID corresponding to a value to be searched for in a database column is determined. This determining includes finding a match in a dictionary for the database column. The dictionary includes a listing of unique values in the column with corresponding unique ValueIDs.

At 220, a row of an index vector for the database column at which to begin a scan for the ValueID is identified. The identifying includes reading a ValueID lookup table that maps each unique ValueID to a starting position in the index vector for the database column such that the ValueID does not occur in the index vector prior to the starting position. As noted above, the ValueID lookup table can include group ranges of ValueIDs such that the ValueID lookup table lists, for each group range, a first occurrence in the index vector of any ValueID in the group range. The group ranges can be regularly spaced at fixed intervals in some variations (e.g. each group range can include a same number of ValueIDs). In other variations, the group ranges can have sizes that increase exponentially or by some other metric from a first group range along a series of group ranges.

The index vector is scanned at 230, beginning at the starting position to find at least one occurrence of the ValueID corresponding to the value being searched, and at 240 a result is returned that includes one or more row locations in the database column corresponding to the at least one occurrence in the index vector of the ValueID corresponding to the value being searched.

In some variations, upon determining that a new value to be added to the database column is a new unique value, a new dictionary row is appended to the dictionary for the database column. The dictionary row includes the new unique value and a new ValueID that corresponds to the new unique value (and that indicates a position of the dictionary row in the dictionary). An index vector entry that includes the new ValueID corresponding to the new unique value is appended to the end of the index vector, and the ValueID lookup table is updated to indicate a first position in the index vector where the ValueID occurs.

Figure 3:
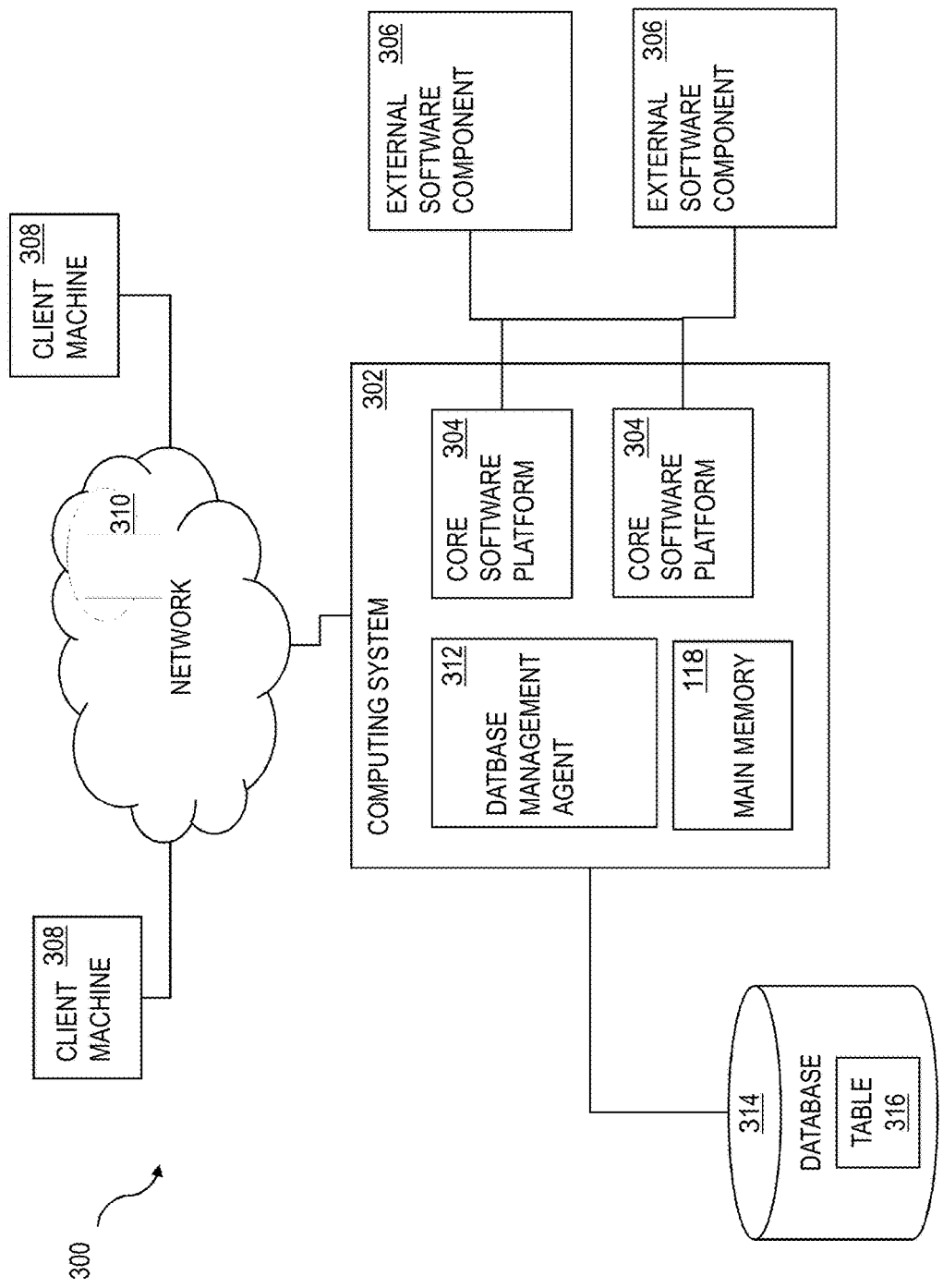
FIG. 3 shows a diagram illustrating aspects of a system showing features consistent with implementations of the current subject matter.

FIG. 3 shows a diagram of a system 300 that can implement one or more features consistent with the current subject matter. A computing system 302 can include one or more core software platform modules 304 providing one or more features of a business software system or other software that includes database management features. The computing system can also aggregate or otherwise provide a gateway via which users can access functionality provided by one or more external software components 306. One or more client machines 308 can access the computing system, either via a direct connection, a local terminal, or over a network 310 (e.g. a local area network, a wide area network, a wireless network, the Internet, or the like).

A database management agent 312 or other comparable functionality can access a database 314 that includes at least one table 316, which can in turn include at least one column. The database management agent 312 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like.

The database management agent 312 or other comparable functionality can be configured to load a database table 316, or other comparable data set, into the main memory 318. The database management agent 312 can be configured to load the information from the database 314 to the main memory 318 in response to receipt of a query instantiated by a user or computer system through one or more client machines 308, external software components 306, core software platforms 304, or the like.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:

determining a ValueID corresponding to a value to be searched for in a database column, the determining comprising finding a match in a dictionary for the database column, the dictionary comprising a listing of unique values in the column with corresponding unique ValueIDs;

identifying a row of an index vector for the database column at which to begin a scan for the ValueID, the identifying comprising reading a ValueID lookup table that maps group ranges of unique ValueIDs to a first occurrence in the index vector of any ValueID in the corresponding group range, the first occurrence corresponding to a starting position in the index vector for the database column to begin the scan for the ValueID corresponding to the value to be searched, the index vector comprising an insert-only data structure, wherein the rows of the index vector for the database column are ordered in an order of insertion, and not reordered by group ranges of ValueIDs;

scanning the index vector beginning at the starting position to find at least one occurrence of the ValueID corresponding to the value being searched; and returning a result comprising one or more row locations in the database column corresponding to the at least one occurrence in the index vector of the ValueID corresponding to the value being searched.

2. The computer program product as in claim 1, wherein the group ranges are of a same size.

3. The computer program product as in claim 1, wherein the group ranges have variable sizes.

4. The computer program product as in claim 3, wherein the variable sizes increase exponentially from a first group range along a series of group ranges.

5. The computer program product as in claim 1, wherein the operations further comprise:

upon determining that a new value for adding to the database column is a new unique value, appending a new dictionary row to the dictionary for the database column, the new dictionary row comprising the new unique value and a new ValueID that corresponds to the new unique value;

appending an index vector entry that includes the new ValueID corresponding to the new unique value to an end of the index vector;

updating the ValueID lookup table to indicate a first position in the index vector where the ValueID occurs; and initiating adding of a new value to a database column, the initiating comprising determining that the new value is a new unique value.

6. A method for implementation by one or more data processors forming part of at least one computing system, the method comprising:

determining a ValueID corresponding to a value to be searched for in a database column, the determining comprising finding a match in a dictionary for the database column, the dictionary comprising a listing of unique values in the column with corresponding unique ValueIDs;

identifying a row of an index vector for the database column at which to begin a scan for the ValueID, the identifying comprising reading a ValueID lookup table that maps group ranges of unique ValueIDs to a first occurrence in the index vector of any ValueID in the corresponding group range, the first occurrence corresponding to a starting position in the index vector for the database column to begin the scan for the ValueID corresponding to the value to be searched, the index vector comprising an insert-only data structure, wherein the rows of the index vector for the database column are ordered in an order of insertion, and not reordered by group ranges of ValueIDs;

scanning the index vector beginning at the starting position to find at least one occurrence of the ValueID corresponding to the value being searched; and returning a result comprising one or more row locations in the database column corresponding to the at least one occurrence in the index vector of the ValueID corresponding to the value being searched.

7. The method as in claim 6, wherein the group ranges are of a same size.

8. The method as in claim 6, wherein the group ranges have variable sizes.

9. The method as in claim 8, wherein the variable sizes increase exponentially from a first group range along a series of group ranges.

10. The method as in claim 6, further comprising:

upon determining that a new value for adding to the database column is a new unique value, appending a new dictionary row to the dictionary for the database column, the new dictionary row comprising the new unique value and a new ValueID that corresponds to the new unique value;

appending an index vector entry that includes the new ValueID corresponding to the new unique value to an end of the index vector;

updating the ValueID lookup table to indicate a first position in the index vector where the ValueID occurs; and initiating adding of a new value to a database column, the initiating comprising determining that the new value is a new unique value.

11. A system comprising:

computer hardware comprising at least one programmable processor configured to perform operations comprising:

determining a ValueID corresponding to a value to be searched for in a database column, the determining comprising finding a match in a dictionary for the database column, the dictionary comprising a listing of unique values in the column with corresponding unique ValueIDs;

identifying a row of an index vector for the database column at which to begin a scan for the ValueID, the identifying comprising reading a ValueID lookup table that maps group ranges of unique ValueIDs to a first occurrence in the index vector of any ValueID in the corresponding group range, the first occurrence corresponding to a starting position in the index vector for the database column to begin the scan for the ValueID corresponding to the value to be searched, the index vector comprising an insert-only data structure, wherein the rows of the index vector for the database column are ordered in an order of insertion, and not reordered by group ranges of ValueIDs;

scanning the index vector beginning at the starting position to find at least one occurrence of the ValueID corresponding to the value being searched; and returning a result comprising one or more row locations in the database column corresponding to the at least one occurrence in the index vector of the ValueID corresponding to the value being searched.

12. The system as in claim 11, wherein the group ranges are of a same size.

13. The system as in claim 11, wherein the group ranges have variable sizes.

14. The system as in claim 13, wherein the variable sizes increase exponentially from a first group range along a series of group ranges.

15. The system as in claim 11, wherein the operations further comprise:

upon determining that a new value for adding to the database column is a new unique value, appending a new dictionary row to the dictionary for the database column, the new dictionary row comprising the new unique value and a new ValueID that corresponds to the new unique value;

appending an index vector entry that includes the new ValueID corresponding to the new unique value to an end of the index vector;

updating the ValueID lookup table to indicate a first position in the index vector where the ValueID occurs; and initiating adding of a new value to a database column, the initiating comprising determining that the new value is a new unique value.

* * * * *